Aug. 31, 1926.
J. H. ASHBAUGH ET AL
1,597,755
REGULATOR SYSTEM
Filed March 15, 1923
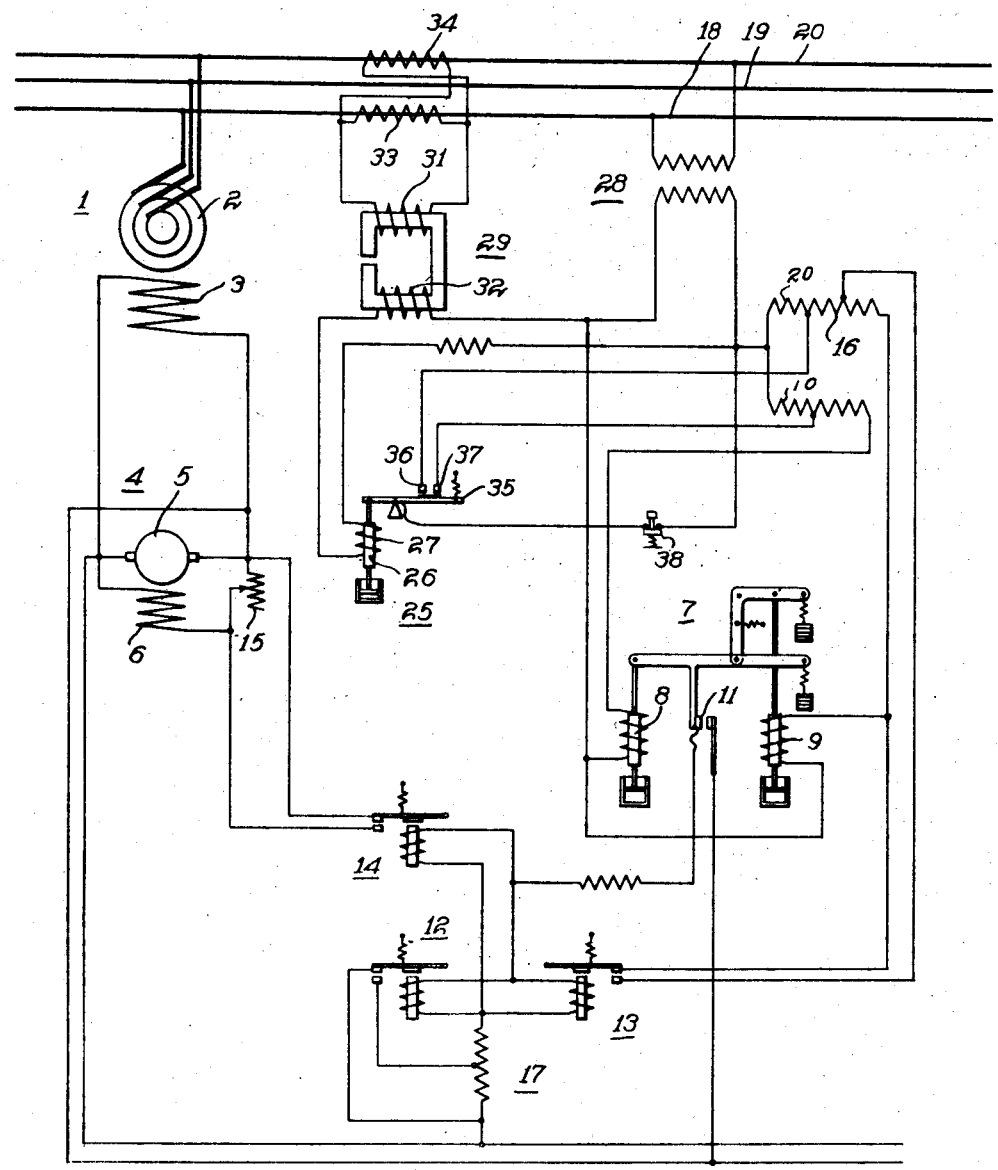
WITNESSES:
INVENTORS
John H. Ashbaugh &
Hollis K. Sels.
BY
ATTORNEY Patented Aug. 31, 1926.

1,597,755

UNITED STATES PATENT OFFICE.

JOHN H. ASHBAUGH, OF WILKINSBURG, AND HOLLIS K. SELS, OF PITTSBURGH, PENNSYLVANIA, ASSIGNORS TO WESTINGHOUSE ELECTRIC & MANUFACTURING COMPANY, A CORPORATION OF PENNSYLVANIA.

REGULATOR SYSTEM.

Application filed March 15, 1923. Serial No. 625,255.

Our invention relates to automatic regulating systems, and it has special relation to voltage-regulating systems.

One object of our invention is to provide a system of the above-indicated character with means for changing the setting of the regulator mechanism when the load is disconnected from the circuit being regulated.

In systems of distribution having a generator connected thereto, and a synchronous condenser at the receiver end of the supply line, it is customary practice to have a circuit-breaker so arranged as to disconnect the condenser from the line whenever the load thereupon is lost, for any reason. Such action inherently increases the voltage at the receiver end of the supply line, with consequent danger and inconvenience. By the present invention, a predetermined amount of resistance is cut out of the circuits of the control elements of a voltage regulator, normally operating to maintain a predetermined voltage, so that the setting of said regulator is varied to automatically lower the excitation of the generator a sufficient amount to prevent the increase in voltage at the receiver end of the supply line under the above-described conditions.

Reference may now be had to the accompanying drawing, in which is illustrated a generator 1 having an armature 2 and a field-magnet winding 3 that is energized from an exciter 4, having an armature 5 and a field-magnet winding 6.

It has not been deemed necessary to illustrate the condenser and circuit-breaker referred to above, since they constitute well-known equipment functioning in a familiar manner.

The excitation of the generator 1 is controlled by a voltage regulator 7 having a main operating electromagnet 8 and a vibratory electromagnet 9 that are adapted to control the operation of contact members 11. The contact members control the energization of relays 12, 13 and 14. The relay 14 controls a shunt circuit for a resistor 15, which is located in the circuit of the field-magnet winding 6 of the exciter. The relay 13 controls a shunt circuit for a resistor 16, in circuit with the vibratory electromagnet 9, while the relay 12 controls a shunt circuit for a resistor 17, in circuit with the relays 12, 13 and 14. The voltage regulator thus far described is what may be termed a broad-range regulator permittitng the control of the main generator 1, although the effective excitation thereof may be below the point of stable operation of the exciter 4. A regulator of this type is described in detail in the co-pending application of J. H. Ashbaugh, Serial No. 452,161, filed March 14, 1921.

When, for any reason, the load is taken off the circuit 18, 19 and 20, which is supplied by the generator 1, the circuit-breaker (not shown) automatically functions to disconnect the condenser, as explained above. Such action results in an immediate increase in the voltage at the condenser end of the line circuit, unless the voltage supplied by the generator is reduced to compensate therefor.

By the present invention, the setting of the regulator 7 is automatically changed to lower the excitation of the generator 1, and accordingly, the voltage of the supply circuits connected thereto under such conditions. A relay 25, comprising a core armature 26 and an energizing coil 27, which is energized from a potential transformer 28, is connected across the power circuit 18, 19 and 20. In series relation with the energizing circuit of the electromagnet 25 is a compensator 29 having a primary winding 31 and a secondary winding 32. The compensator 29 is energized from cross-connected series transformers 33 and 34 connected in the power circuit.

The compensator 29 delivers a voltage that is 90° out of phase with the voltage from the series transformers 33 and 34. Under normal load conditions upon the power line 18, 19 and 20, the voltage from the compensator 29 will be 90° out of phase with the voltage from the transformer 28. When, however, the load is taken off, and the condenser is disconnected from the power line, the charging KVA of the line increases, and the voltage delivered by the compensator 29, due to the wattless current of the charging KVA, is in opposition to the voltage, that is, 180° out of phase with the voltage from the transformer 28.

It will be apparent, therefore, that when normal load exists on the power line, the coil 27 of the relay 25 will be energized from the transformer 28, causing the core 26 to be pulled up, thereby disconnecting the circuits through contacts 36 and 37. As the load is taken off the power line, and the voltage from the compensator 29 opposes the voltage from the transformer 28, the coil 27 of the relay 25 is deenergized, permitting the lever 35 to be raised and to engage the contact members 36 and 37. Circuits are thereby established, through the contact members 36 and 37 and the button 38, short-circuiting portions 10 and 20 of the resistors in circuit with the regulator coils 8 and 9. Short-circuiting the resistors 10 and 20 causes an increase in the energization of the regulator coils 8 and 9, in response to which the regulator effects a decrease in the excitation of the generator field winding.

Since it will be possible for a condition to arise whereby operation may be resumed at the receiver end of the supply line without promptly re-setting the voltage regulator to function normally, a manually operable reset push-button 38 is provided in the circuit controlled by the electromagnet 25.

Modifications in the system and in the arrangement and location of parts may be made within the spirit and scope of my invention, and such modifications are intended to be covered by the appended claims.

We claim as our invention:

1. In a regulator system, the combination with a power circuit, a dynamo-electric machine connected thereto, of a regulator actuated in accordance with a characteristic of said circuit for governing the excitation of said dynamo-electric machine, and means energized by electromotive forces produced, respectively, by the current and voltage variations in said circuit for changing the setting of said regulator.

2. In a regulator system, the combination with a power circuit, a dynamo-electric machine connected thereto, of a regulator actuated in accordance with a characteristic of said circuit for governing the excitation of said dynamo-electric machine, an electro-responsive means for varying the setting of said regulator, means for energizing said electro-responsive means in accordance with the voltage of said circuit, and means for energizing said electro-responsive means in accordance with the current of said circuit.

3. In a regulator system, the combination with a power circuit, a dynamo-electric machine connected thereto, of a regulator actuated in accordance with a characteristic of said circuit for governing the excitation of said dynamo-electric machine, a relay for varying the setting of said regulator, a circuit for energizing said relay, means for introducing into said circuit a voltage that is produced by the voltage of said power circuit, and means for introducing into said circuit a voltage that is produced by the current of said power circuit.

4. In a regulator system, the combination with a power circuit, and a dynamo-electric machine connected thereto, of a regulator actuated in accordance with a characteristic of said circuit for governing the excitation of said dynamo-electric machine, a relay for varying the setting of said regulator, and means for energizing said relay by opposing electromotive forces produced, respectively, by the current and the voltage in said power circuit.

5. In a regulator system, the combination with a power circuit, a generator connected thereto and means for varying the excitation of said generator, of a regulator for controlling said means and operating in accordance with the voltage of said circuit, said regulator having a predetermined setting, and electromagnetic means for varying the energization of said regulator, said electromagnetic means being normally energized by opposing electromotive forces produced, respectively by the current and the voltage in said circuit.

In testimony whereof, we have hereunto subscribed our names this 14th day of March, 1923, and this 27th day of February, 1923, respectively.

JOHN H. ASHBAUGH.
HOLLIS K. SELS.